United States Patent [19]

Moe

[11] Patent Number: 5,014,481

[45] Date of Patent: May 14, 1991

[54] PANEL CONFIGURABLE FOR SELECTIVE INSULATION OR HEAT TRANSMISSION

[76] Inventor: Michael K. Moe, 1 Mann St., Irvine, Calif. 92715

[21] Appl. No.: 322,186

[22] Filed: Mar. 13, 1989

[51] Int. Cl.⁵ .............................................. E04B 2/00
[52] U.S. Cl. ................................................ 52/406
[58] Field of Search ................ 52/171, 785, 810, 407, 52/406

[56] References Cited

U.S. PATENT DOCUMENTS

| | | | |
|---|---|---|---|
| 3,249,682 | 5/1966 | Laing | 52/2 J X |
| 4,088,117 | 5/1978 | Keyes | 126/270 |
| 4,207,869 | 6/1980 | Hart | 126/450 |
| 4,297,989 | 11/1981 | Wozny et al. | 126/441 |
| 4,370,974 | 2/1983 | Maxey | 126/439 |
| 4,396,009 | 8/1983 | Enga | 126/450 |
| 4,411,256 | 10/1983 | fleming | 126/441 |
| 4,525,968 | 7/1985 | Fricker et al. | 52/407 X |

Primary Examiner—John E. Murtagh
Attorney, Agent, or Firm—Roy A. Ekstrand

[57] ABSTRACT

A configurable panel comprises a generally rectangular housing defining an interior cavity. A plurality of inwardly extending vane members support a corresponding plurality of thin flexible foils in a parallel spaced arrangement in one configuration and in a compressed collapsed arrangement in an alternate configuration. Means are provided for configuring the internally supported foils in either parallely spaced or collapsed configuration.

14 Claims, 2 Drawing Sheets

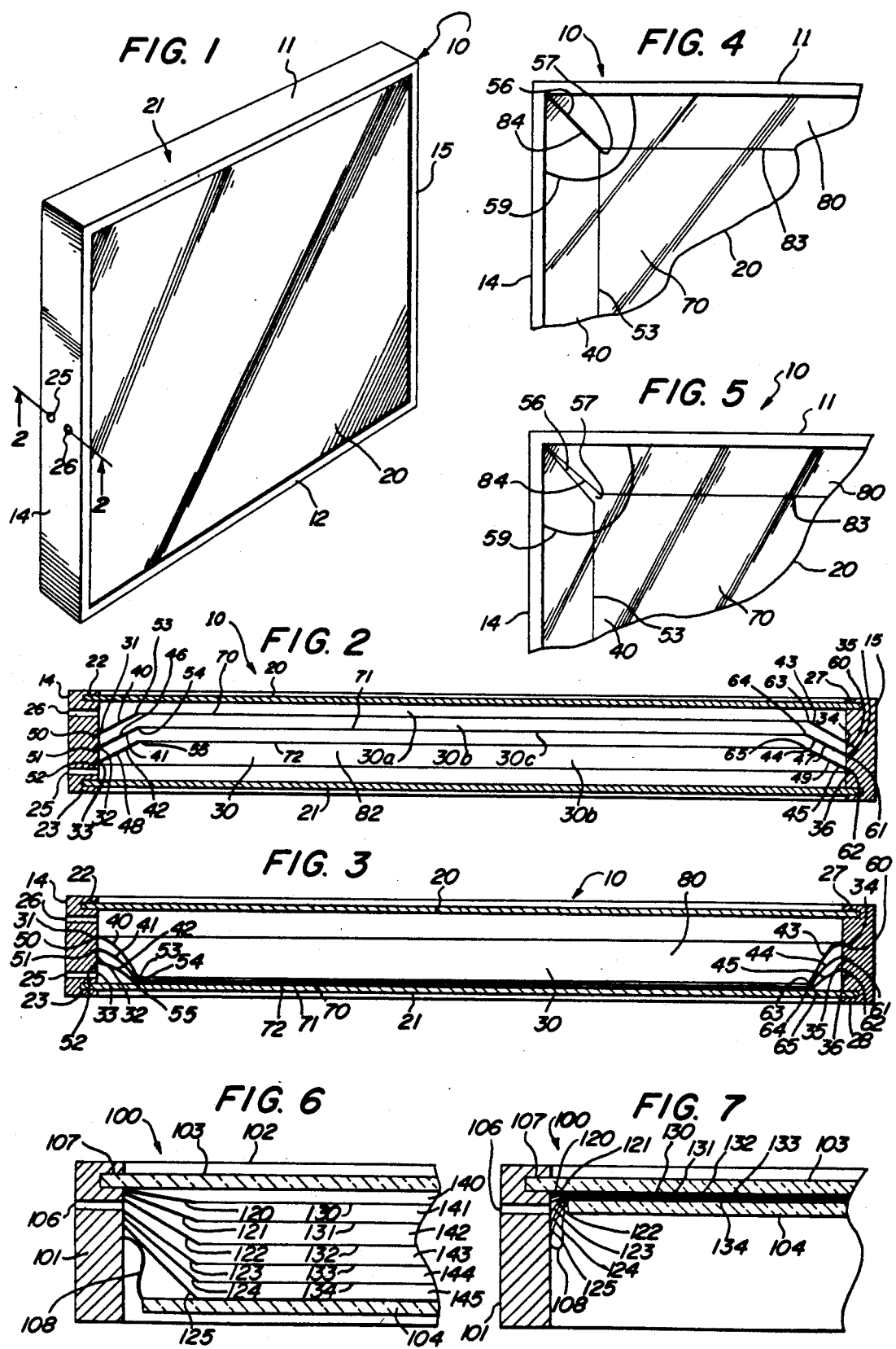

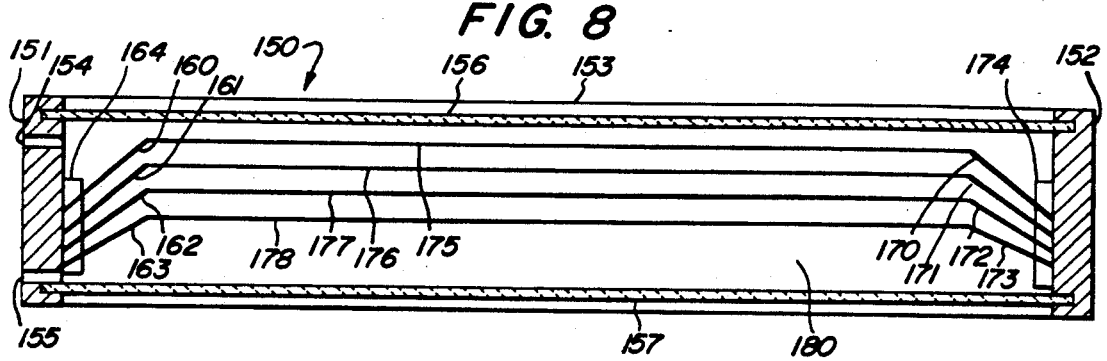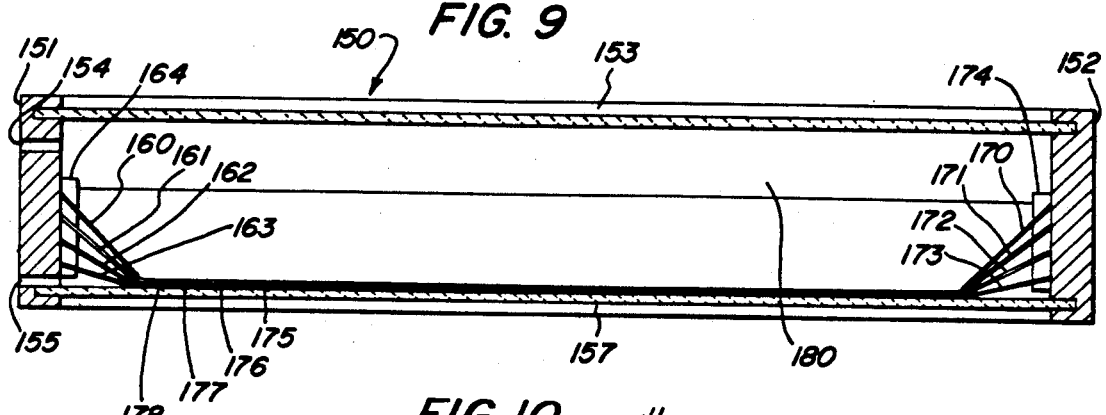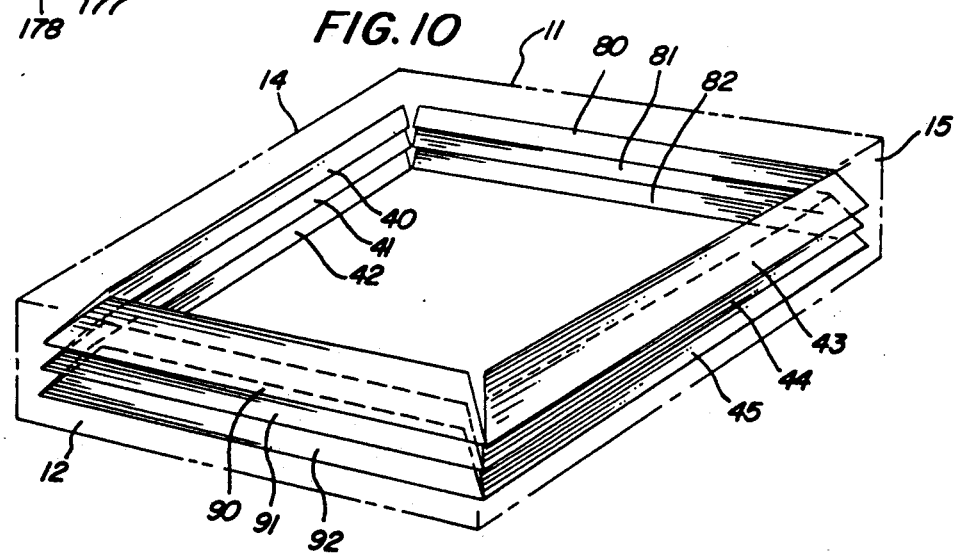

PANEL CONFIGURABLE FOR SELECTIVE INSULATION OR HEAT TRANSMISSION

FIELD OF THE INVENTION

This invention relates generally to thermally conductive and insulative panels including those interacting with solar energy.

BACKGROUND OF THE INVENTION

In the maintenance of commercial structures and dwelling structures and the like, a basic problem arises in maintaining the internal temperatures of such structures within the acceptable working range. The task is made more difficult by the ever changing external temperatures of the environments outside such structures. In most inhabited locations, substantial temperature variation of the environment is encountered both seasonally and during the daily cycle of daylight and darkness. Most approaches to maintaining internal temperatures of closed structures have provided heating and cooling with internal distribution systems for alternatively increasing or decreasing the temperature of the structures interior. While such processes generally work satisfactorily, they are often costly and inefficient. In addition, such heating and cooling systems have been found to consume prohibitive amounts of the nonreusable nonrenewable energy sources which power them.

In recent years, the increased concern over the depletion of nonrenewable energy sources has motivated practitioners of the heating and cooling art to expend efforts at using the available energy in the natural environment rather than opposing it. One of the most significant examples of such effort is found in the wide variety of solar heating devices which have been provided to utilize the freely available solar energy. The structures of such devices vary substantially. In their simplest form, solar heating devices comprise panel enclosures supported to receive sunlight within the panel interior. Heat conductive means within the solar panels absorb the incident solar energy and carry it to its place of eventual use. In more complex systems, the functioning of the solar panels is adjustable either by position adjustment or by interior mechanisms to vary the degree of energy absorption taking place in the solar panel.

U.S. Pat. No. 4,088,117 issued to Keyes sets forth SOLAR HEAT COLLECTING UNITS in which a solar heat collecting element is provided with an interior enclosure having one surface optimized for the transmission of solar energy to the panel interior and heat absorbing or collecting plates assembled within the panel interior. The solar light transmissive panel is provided with a reflective coating on its interior surface to better track the solar radiation within the panel. Means are provided for altering the configurations of the interior plates to change the heat absorbing character of the solar heat collecting units.

U.S. Pat. No. 4,205,658 issued to Olark sets forth a HEAT TRANSFER PANEL which can be used as a solar energy collector or as a heat rejecting and absorbing panel. The heat transfer panel utilizes a thin flexible membrane within the panel to define a plurality of fluid channels. The intended use of the heat transfer panel is the incorporation of the panel as an integral building element of the structure. The panel is capable of radiating heat outwardly from the panel or absorbing heat energy into the panel.

U.S. Pat. No. 4,207,869 issued to Hart sets forth a SOLAR COLLECTOR CONSTRUCTION consisting of a pair of spaced apart rigid panels having aligned edges and a flexible web strung between the end panels to provide a plurality of parallel spanning web elements. The end panels and web structure is enclosed within a pair of front and back surfaces to complete the panel enclosure. The web structure forms a plurality of adjacent chambers within the panel which function to limit the convective heat interchange between the panels.

U.S. Pat. No. 4,297,989 issued to Wozny, et al. sets forth a SOLAR HEAT COLLECTOR having a panel enclosure supporting solar energy collecting apparatus and including a screen positioned between the light emitting layer and the energy absorbing layer for increased energy retention. A forced air heat transfer apparatus is adapted to provide a flow of to-be-heated through the panel interior.

U.S. Pat. No. 4,370,974 issued to Maxey sets forth an INVERTED CHANNEL FOCUSING SOLAR COLLECTOR formed in the shape of an inverted geometric cusp of the second kind which permits the collection of direction and diffuse solar radiation. The collector attenuates losses by thermal convection and reverse radiation or re-radiation of energy to the cold or night sky. The multiply-curved panel structure is compact and alleviates the need for elaborate sensing and tracking mechanisms.

U.S. Pat. No. 4,396,009 issued to Enga sets forth a HELIOTROPIC WIDE SPECTRUM SOLAR PANEL in which an elongated shell of housing is provided having a closed lower side and an open upper side oppositely positioned thereto. The open side includes a transparent panel while the lower side supports a plurality of side by side elongated trough members disposed within the housing for absorbing solar energy. Means are provided for directing an air flow through and across the trough members to carry away absorbed solar heat.

U.S. Pat. No. 4,411,256 issued to Fleming sets forth a SOLAR COLLECTOR having an insulated housing which supports a plurality of parallel layers of fluid carrying members disposed within the housing interior and arranged in a staggered serpentine arrangement. A first screen extends back and forth between the fluid carriers while a second screen is positioned intermediate the outermost fluid carrier and the transparent housing cover. The first and second screens diffuse the received solar energy and absorb heat which is transferred to the fluid carriers.

While such prior art devices provide some benefits in absorbing and utilizing solar energy and in performing as heat absorbers or radiators, they fall short of addressing the overall needs of interior environment temperature control. There arises, therefore, a need in the art for a structure which better controls the transfer of heat energy between the interior of inhabited structures and the exterior environment.

SUMMARY OF THE INVENTION

Accordingly, it is a general object of the present invention to provide an improved thermal panel. It is a more particular object of the present invention to provide a configurable panel for selective insulation or heat transmission in which the panel is alternatively configured as an insulative or conductive member.

In accordance with the invention, there is provided a panel enclosure having an interior and exterior surface supporting a plurality of planar foils within the panel interior. Means are provided for alternatively positioning the interior foils in a parallel spaced apart array to provide a plurality of insulating enclosures therebetween or in a compressed overlying arrangement in which thermal conductivity is maximized.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a perspective view of a configurable panel constructed in accordance with the present invention;

FIG. 2 is a section view of the present invention configurable taken along section lines 2—2 in FIG. 1 depicting the panel in its insulative configuration;

FIG. 3 is a section view of the present invention configurable panel taken along section lines 2—2 in FIG. 1 showing the present invention programmable panel in its thermally conductive configuration;

FIG. 4 sets forth a partial view of the present invention configurable panel;

FIG. 5 sets forth a partial view of the present invention configurable panel;

FIG. 6 sets forth a partial section view of an alternate embodiment of the present invention configurable panel in its heat insulative configuration;

FIG. 7 sets forth a partial section view of the embodiment of FIG. 6 showing the present invention configurable panel in its thermally conductive configuration;

FIG. 8 sets forth a section view of an alternate embodiment of the present invention configurable panel in its thermally insulative configuration;

FIG. 9 sets forth a section view of the alternate embodiment of FIG. 8 shown in its thermally conductive configuration; and FIG. 10 is a simplified pictorial view of tee embodiment of FIGS. 2 and 8.

DESCRIPTION OF THE PREFERRED EMBODIMENTS

FIG. 1 sets forth a perspective view of a configurable panel constructed in accordance with the present invention and generally referenced by numeral 10. Panel 10 includes a top and bottom support 11 and 12 respectively and a pair of side supports 14 and 15. Top 11, bottom 12, and sides 14 and 15 are mutually joined to form a rectangular enclosure for panel 10. Panel 10 further includes a planar front sheet 20, preferably formed of a transparent material, extending between top 11, bottom 12, and sides 14 and 15 and a similar planar rear sheet 21 also extending between top 11, bottom 12, and sides 14 and 15. Alternatively, front sheet 20 may be formed having an optically transmitting simulation of brick, wood, tile or other aesthetically pleasing appearance. Front sheet 20 and rear sheet 21 combine to complete the enclosure of panel 10. To enhance the appearance of panel 10, rear sheet 21 may be formed of a thermally conductive material formed to resemble wood or other decorative character. Side 14 further defines a pair of inwardly extending ports 25 and 26 which, in accordance with the invention described below in greater detail, extend through side 14 and provide communication with interior cavity 30 (seen in FIG. 2) within panel 10.

In its normal operation, panel 10 is supported within a wall or partition such as the exterior wall or roof of a dwelling or commercial building. When so supported, top 11, bottom 12, and sides 14 and 15 are secured within such wall or mutually secured to additional panels similar to panel 10 to form extended panel sections. In either event and in accordance with the operation set forth below in greater detail, panel 10 functions in response to the selective communication of ports 25 and 26 with sources of pressurized air and/or vacuum sources to configure panel 10 to alternatively operate as a solar heat collecting panel or which conducts heat through the panel to the structure's interior or as an insulating panel. In addition, as will be set forth below in greater detail, front sheet 20 may alternatively be fabricated from a heat conductive opaque material such as aluminum in which event panel 10 provides selective insulation or heat conductive properties.

FIG. 2 sets forth a section view of panel 10 taken along section lines 2—2 in FIG. 1. Side 15 defines a rectangular cross sectional member having a pair of grooves 27 and 28 as well as a plurality of smaller closely spaced grooves 60, 61 and 62. Grooves 27 and 28, as well as grooves 60, 61, and 62 extend the length of side 15. Similarly, side 14 defines a rectangular cross section elongated member defining a pair of outer grooves 22 and 28 and a plurality of smaller closely spaced grooves 31, 32 and 33. In similar construction to side 15, grooves 22 and 23 as well as grooves 31, 382, and 33 extend the entire length of side 14. In addition, side 14 defines a pair of inwardly extending ports 25 and 26. As shown above, sides 13 and 14 are supported in a parallel spaced apart relationship (see FIG. 1) by top portion 11 and bottom portion 12. A planar front sheet 20 extends between and is received within groove 22 of side 14 and groove 27 of side 15. Similarly, rear sheet 21 extends into and is received within groove 23 of side 14 and groove 28 of side 15. Thus, as described above, the cooperation of sides 14 and 15 and front sheet 20 and rear sheet 21 combine to form an interior cavity 30.

It should be noted by simultaneous reference to FIGS. 1 and FIG. 2 that, with the exception of ports 25 and 26, the structure of top 11 and bottom 12 is virtually identical to sides 14 and 15. Thus, while not seen in FIG. 2, top 11 and bottom 12 should be understood to define corresponding grooves in the same manner as grooves 22 and 28 in side 14 and grooves 27 and 28 in side 15 and to similarly receive and support the corresponding edge portions of front sheet 20 and rear sheet 21 to complete the enclosure of interior cavity 30. Similarly, top 11 and bottom 12 should be further understood to define a trio of grooves virtually identical to grooves 31 through 33 in side 14 and grooves 60 through 62 in side 15, the functions of which are set forth below in greater detail.

A plurality of planar elongated vane members 40, 41 and 42 define respective edge portions 50, 51 and 52 which are received within grooves 31, 32 and 33 respectively to support vanes 40, 41, and 42 within the interior of side 14 in a parallel relationship. Because grooves 31, 32 and 33 are angularly disposed within side 14, vanes 40, 41 and 42 extend outwardly from side 14 and are angled toward front sheet 20. Similarly, a trio of vanes 43, 44 and 45 define elongated flexible planar members having edge portions 60, 61 and 62 respectively which are received within grooves 34, 35 and 36 of side 15 to support vanes 48 through 45 in a complementary angular parallel arrangement to vanes 40 through 42. A similar trio of elongated planar vanes 80, 81 and 82 are secured to top 11 in the same fashion as vanes 40, 41 and 42 are secured to side 14 and vanes 43, 44 and 45 are secured to side 15. Thus, vanes 80, 81 and 82 extend from top 11 in a parallel relationship angled toward front sheet 20. As is better seen in FIG. 10, a corresponding set of vanes 90, 91 and 92 are supported by bottom 11 and similarly extend from bottom 11 toward front sheet 20.

A thin flexible planar foil 70, preferably formed of a resilient material such as mylar film, is secured to edge 53 of vane 40 and to edge 63 of vane 43. In its preferred form, foil 70 supports a dark colored outer surface (toward front sheet 20) for solar energy absorption. Foil 70 is similarly secured to vane 80 extending from top 11 and vane 90 extending from bottom 12 (the latter seen in FIG. 10). It should be understood that the attachment of foil 70 to vanes 40, 43, 80 and 90 is a complete sealed attachment in which a gas-tight seal is formed by the combination of vanes 40, 43, 80, and 90 and foil 70 within the interior of sides 14 and 15, top 11, and bottom 12.

A similar foil 71 is secured to edges 54 and 64 of vanes 41 and 44 and to vanes 81 and 91 (the latter seen in FIG. 10). Similarly, a third foil 72 similar to foils 70 and 71 is secured to edge 55 of vane 42 and edge 65 of vane 45 and to vane 82 in top 11 and vane 92 in bottom 12 (the latter seen in FIG. 10). Foils 70, 71 and 72 divide interior cavity 30 into volumes 30a, 30b, 30c and 30d. While the boundary formed by foil 70 and its supporting vanes forms a gas-tight boundary, the boundaries of foils 71 and 72 are, for reasons set forth below, not gas-tight. Accordingly, vane 41 defines a vent aperture 46 and vane 44 defines an aperture 47. Also, vane 42 defines a vent aperture 48 while vane 45 defines an aperture 49. In their preferred form, the inner surfaces of foils 70, 71 and 72 (toward rear sheet 21) are coated with a metalized layer to block infrared transmission.

As mentioned above, each of the vanes shown in FIG. 10 is formed of a spring-like resilient material and is firmly secured to its respective supporting surface in an angular relationship. In accordance with an important aspect of the present invention embodiment shown in FIG. 2, the resilience of each of the vanes within panel 10 provides a stretching force upon the respective foils which they support. By way of specific example, the resilience of vanes 40 and 43 exerts an outward lateral stretching force upon foil 70 to maintain foil 70 in a stretched support between sides 14 and 15. Correspondingly, while not seen in FIG. 2, it should be understood that a similar outward force is exerted upon foil 70 between top 11 and bottom 12 by the resilient spring force of vanes 80 and 90 (the latter seen in FIG. 10). Thus, foil 70 is stretched and maintained in tension by the combined resilient spring forces of the vanes supporting it. Correspondingly, foil 71 is maintained in a similar manner in which an outwardly directed tension support is provided by vanes 41, 44, 81 and 91 (the latter seen in FIG. 10). Finally, foil 72 is similarly supported in tension by vanes 42, 45, 82 and 92 (latter seen in FIG. 10).

Because the supporting vanes of foils 70, 71 and 72 are evenly spaced within interior cavity 30, foils 70, 71 and 72 are maintained in a substantially parallel arrangement. The parallel arrangement of foils 70, 71 and 72 divides interior cavity 80 into volumes 30a, 30b, 30c and 30d which, but for vent apertures 25 and 26, 46, 47, 48 and 49, are closed air spaces. Thus, with foils 70, 71 and 72 configured and supported as shown in FIG. 2, panel 10 is switched to its insulating configuration. The high insulating characteristic of panel 10 when so configured arises from the captive or stagnant air spaces found in volumes 30a through 30d inclusive. As is well known, the creation of captive or stagnant air spaces within a volume such as interior cavity 30 provides a substantial barrier to the transmission of heat through the interior cavity. It should be noted that the resilience of the vanes supporting foils 70 through 72 is solely responsible for the support of foils 70 through 72 in the insulating configuration shown in FIG. 2. Thus, both ports 25 and 26 are simply exposed to atmospheric pressure to equalize the air pressure on both sides of foil 70 and thereby permit the resilience of the supporting vanes of foils 70 through 72 to configure the foils in the insulating arrangement shown.

FIG. 8 sets forth the cross section of panel 10 taken along section lines 2—2 in FIG. 1 when panel 10 is switched to its thermally conductive configuration. As will be apparent, sides 14 and 15 are supported in a spaced apart arrangement by planar front sheets 20 and 21 in the identical fashion shown in FIG. 2. Similarly, vanes 40, 41 and 42, as well as vanes 43, 44 and 45 are supported by sides 14 and 15 in the identical manner shown in FIG. 2. By way of further similarity, it should be understood that vanes 80, 81 and 82 as well as vanes 90, 91 and 92 (seen in FIG. 10) are similarly supported in top 11 and bottom 12 respectively. Foils 70, 71 and 72 are fully supported by their supporting vanes in the manner shown in FIGS. 2 and 10. The difference in foil configuration and support shown in FIG. 3 as opposed to FIG. 2 results solely from the operation of ports 25 and 26 in accordance with an important aspect of the present invention. Specifically, port 26 is exposed to a source of atmospheric pressure while port 25 is coupled to a source of vacuum causing a substantially greater pressure to be imposed on the upper surface of foil 70 and a lower pressure on the lower surface of foil 70. With the pressure differential created upon foil 70 by the above-described operation of ports 25 and 26, a collapsing pressure is exerted upon foil 70 which overcomes the resilient support of vanes 40, 43, 80 and 90 (better seen in FIG. 10) which forces foil 70 downward toward rear sheet 21. As the pressure differential is maintained within interior cavity 30, foil 70 continues to collapse downwardly and is ultimately driven against rear sheet 21 carrying with it foils 71 and 72 to collapse all three foils against rear sheet 21 and configuring panel 10 in the manner shown in FIG. 8. During the collapsing of foils 70, 71 and 72 caused by the higher pressure within volume 30a, the resilient supports for all three foils is overcome and foils 70 through 72 are tightly forced against rear sheet 21. The cooperation of vent apertures 46 through 49 permits the configuration of foils 70 through 72 to the thermal conducting position of FIG. 3 by venting any trapped air within volumes 30b or 30c and permits the evacuation of volumes 30b, 30c and 30d through port 25 to complete the switching of configuration of foils 70, 71 and 72 without trapping any air between the foils.

As can be seen with foils 70, 71 and 72 configured in the manner shown in FIG. 8, interior cavity 30 is no longer divided into a plurality of insulating captive air spaces. Concurrently, foils 70, 71 and 72 are tightly compressed against rear sheet 21 providing a maximum of thermal conductivity. Thus panel 10, when configured in the thermally conductive configuration shown in FIG. 3, provides a substantially increased thermal conductivity from that which results when panel 10 is configured in the insulating configuration shown in FIG. 2.

It will be recognized by those skilled in the art that while three foils and corresponding support arrangements are shown in FIG. 10, a substantially different number of foils may be used without departing from the spirit and scope of the present invention. It should also be noted that in the preceding discussions, the material comprising front sheet 20 has remained undescribed. It should be recalled that, as mentioned above, panel 10 may be fabricated either using a transparent material for front sheet 20 or an opaque thermally conductive material such as aluminum. In the former case, panel 10 provides the additional capability of solar heat collection in addition to the above-described switching properties. In the latter case, panel 10 functions solely as a switchable panel providing alternative thermal conductivities in each of its switched conditions. In either event, it will be apparent to those skilled in the art that the operation of the present invention panel provides a thermal panel having substantially different heat conductive properties in each of its alternative configurations.

FIG. 4 and 5 set forth partial views of a corner portion of panel 10 at the junction of top 11 and side 14. As can be seen, side 14 and top 11 are mutually joined to form a corner portion of panel 10. It should be noted at the outset that, while the corner formed at the junction of side 14 and top 11 is shown in FIGS. 4 and 5, the structures of the remaining corners of panel 10 are identical to those shown in FIGS. 4 and 5. Therefore, it should be understood that the discussions and descriptions which follow apply equally well to the corner formed by the junction of top 11 with side 15, the junction of bottom 12 and side 15, and the junction of bottom 12 and side 14. With specific reference to FIGS. 4 and 5, top 11 and side 14 are joined to form a corner support. As described above, a plurality of vanes 40, 41 and 42 (seen in FIG. 2) extend outwardly from side 14. Similarly and as is also described above, a plurality of vanes 80, 81 and 82 (seen in FIG. 2) extend outwardly from top 11. In the drawings shown for FIGS. 4 and 5, vanes 40 and 80 are seen extending out from side 14 and top 11 respectively. As is also described above, foil 70 is secured to edge 53 of vane 40 and to edge 83 of vane 80. Vane 40 further defines an angled edge 56 while vane 80 defines a similarly angled edge 84. The presence of edges 56 and 84 on vanes 40 and 80 respectively permit the above-described movement of vanes 40 and 80 between the positions shown in FIG. 2 and 8 without interference between the vanes. A resilient seal 59 extends outwardly from top 11 and side 14 and overlaps gap 57 between vanes 40 and 80 and is sealingly secured to the corner portion of foil 70 as well as the portions of vanes 40 and 80 adjacent gap 57. Seal 59 is sufficiently resilient to provide a resilient seal between vanes 40 and 80 and foil 70 as vanes 40 and 80 move in the manner shown in FIGS. 2 and 8 and described above. Front sheet 20 extends between top 11 and side 14 and covers the interior of panel 10 in the manner shown and described above. It will be apparent by simultaneous examination of FIGS. 4 and 5 that the relative motions of vanes 40 and 80 cause the width of gap 57 therebetween to change. Accordingly, to maintain the required seal of foil 70, resilient seal 59 expands and contracts as the width of gap 57 is varied due to motion of vanes 40 and 80. As mentioned, the remaining corners of foil 70 are similarly supported and it should be understood that similar sealing members are operative to provide the foregoing described sealing action of seal 59. It should also be noted that for some materials used in the fabrication of foil 70, the required sealing action may be maintained by extending foil 70 across the entire widths of its supporting vanes (in this case, vanes 40 and 80) and securing foil 70 in a sealing attachment to top 11 and side 14. In such case, the seal at gap 57 is maintained by the overlying presence of foil 70. Notwithstanding this alternate configuration of foil 70, it may nonetheless be desirable to continue to include a seal member such as seal 59 to provide stress relieving and further enhancement of the sealing operation as vanes 40 and 80 are moved. As mentioned above, it should be understood that the corner structure of vanes 40 and 80 having angular edges 56 and 84 respectively are typical of the structures of the remaining vanes in panel 10. It should also be apparent that the sealing coverage of the corresponding gaps produced between vanes 40 and 90, between vanes 90 and 48, and between vanes 48 and 80, which support foil 70 are required to have similar sealing arrangements to those shown in FIGS. 4 and 5. It will be equally apparent to those skilled in the art, however, that while the remaining vanes in panel 10 have similar angled gaps at their respective corner intersections to permit free movement of the vanes with respect to each other, no sealing attachment is required therebetween.

FIG. 6 sets forth a partial section view of an alternate embodiment of the present invention configurable panel generally referenced by numeral 100. It should be noted that while a portion of panel 100 is shown in FIG. 6, the remainder of panel 100 is correspondingly constructed to produce a complete configurable panel. Accordingly, panel 100 includes a side 101 and a top 102 joined to form a corner thereof. Side 101 defines a groove 107 and a port 106 extending therethrough. A generally planar front sheet 103, preferably formed of an opaque thermally conductive material such as aluminum, extends across panel 100 and is supported within groove 107 of side 101 and corresponding grooves in the remaining facets (not shown) of panel 100. A plurality of resilient vanes 120, 121, 122, 123, 124 and 125 extend outwardly from side 101. Vanes 120 through 125 may be supported in the manner shown for vanes 40 through 42 in the above-described embodiment of FIG. 2 or in the manner described below in FIG. 8. In either event, vanes 120 through 125 are resiliently urged to the position shown in FIG. 6 in which they angle downwardly from side 101. A generally planar rear sheet 104, preferably formed of a thermally conductive opaque material such as aluminum, is received within panel 100 and is supported by vane 125. A resilient seal member 108 is secured to rear sheet 104 and side 101 to provide a gas-tight seal therebetween. In the position shown in FIG. 6, supporting vanes 120 through 125 extend downwardly and maintain the position of rear sheet 104 as well as the corresponding positions of vanes 120 through 125 in the spaced apart position shown. A plurality of flexible foils 130 through 124 are secured to supporting vanes 120 through 124 in the manner shown and described above. The spacing of vanes 120 through 125 provides a parallel generally equally spaced support for rear sheet 104 and foils 130 through 134. As a result, a plurality of captive air spaces 140 through 145 are created within panel 100 to provide substantial insulative properties for panel 100. With panel 100 configured in its insulating configuration shown in FIG. 6, port 106 is exposed to atmospheric pressure allowing the resilience of the support of vane 125 and the remaining corresponding supports of rear sheet 104 (not shown) to maintain the position of rear sheet 104.

FIG. 7 sets forth the embodiment of FIG. 6 in its thermally conductive configuration resulting from the coupling of port 106 to a source of vacuum. As can be seen, the exposure of port 106 to a source of vacuum together with the cooperating seals operative upon rear sheet 104 (such as seal 108) collapse the support structures provided by vanes 120 through 125 and collapse foils 130 through 134 against front sheet 103. As rear sheet 104 is collapsed against front sheet 103 and foils 130 through 134 are mutually collapsed to the compressed structures shown in FIG. 7 the volumes of air spaces 140 through 145 are virtually eliminated. The resulting structure configures panel 100 into its maximum thermally conductive configuration providing substantial heat flow through panel 100.

Thus, by comparison of FIGS. 6 and 7, it will be apparent that the selective operation of pressure or vacuum at port 106 readily configures panel 100 in either the insulative position shown in FIG. 6 or the thermally conductive position shown in FIG. 7.

FIG. 8 sets forth a still further embodiment of the present invention configurable panel generally referenced by numeral 150. At the outset it should be understood that, apart from the differences set forth in FIGS. 8 and 9, panel 150 is generally similar to panel 10 shown in FIGS. 1 through 3. Accordingly, panel 150 includes a pair of side members 151 and 152, a top member 153, a bottom member (not shown). In further similarity to the above-described structure for panel 10, it should be understood that the structures of top 153 and the corresponding bottom portion (not seen) are similarly configured to sides 151 and 152. Side 151 defines a pair of port passages 154 and 155 extending therethrough. A front sheet 156 and a rear sheet 157 extend between and are supported by sides 151 and 152, top 153 and the bottom portion of panel 150 (not shown) in the manner described above for panel 10. Front sheet 156 is preferably formed of a clear transparent material while rear sheet 157 is preferably formed of an opaque thermally conductive material. The combination of sides 151 and 152, top 153, the bottom portion of panel 150 (not shown), front sheet 156, and rear sheet 157 form an interior cavity 180. A plurality of elongated generally planar vanes 160, 161, 162 and 163 extend outwardly from side 151. A resilient hinge support 164 provides a hinged attachment of vanes 160 through 163 in which the vanes are urged to rotate about hinge structure 164 in a counterclockwise direction toward front sheet 156. A corresponding plurality of vanes 170, 171, 172 and 173 are similarly supported upon side 152 by a corresponding hinge support 174. A plurality of resilient foil members 175, 176, 177 and 178 are secured to and supported by vanes 160 through 163 respectively on one side and vanes 170 through 173 respectively on the other side. In a similar manner to that described above for panel 10, foils 175 through 178 are maintained in a tension support by the resilient spring forces of hinge members 164 and 174. With the exception of the substitution of hinge members 164 and 174 for the resilient support of vanes 160 through 163 and vanes 170 through 173, the embodiment shown in FIGS. 8 and 9 is substantially identical to that set forth in FIGS. 2 and 3 above. Accordingly, the combination of foil 175 and the vanes supporting it such as vanes 160 and 170 form a gas-tight boundary within interior cavity 180. Accordingly, with ports 154 and 155 exposed to atmospheric pressure, the pressure forces on either side of foil 175 are substantially equal and foils 175 through 178 are supported in the configuration shown in FIG. 8 in which a plurality of confined air volumes are formed between the respective foils within interior cavity 180. Thus, in the configuration shown in FIG. 8, panel 150 exhibits a maximum insulative quality.

FIG. 9 sets forth the configuration of panel 150 which results from the coupling of port 155 to a vacuum source. The effect of coupling port 155 to such a backing source produces a decreased pressure on the lower side of foil 175 which causes 175 to be driven toward rear sheet 157 and produces the collapsed configuration shown in FIG. 9. With foils 175 through 178 collapsed against rear sheet 157, panel 150 provides a maximum of thermal conductivity between front sheet 156 and rear sheet 157. In addition, with front sheet 156 formed of a clear or transparent material, additional heat in the form of solar energy passes through front sheet 156 and is captivated within interior cavity 180. Such heat is readily coupled through the combination of foils 175 through 178 and rear sheet 157. Thus, in the configuration shown in FIG. 9, panel 150 provides a maximum of thermal conductivity. Once the vacuum coupled to port 155 is released, the pressure differential upon foil 175 is removed and the resilient action of hinges 164 and 174 return vanes 160 through 163 and vanes 170 through 173 to the positions shown in FIG. 8. Thus, panel 150 may be configured in either an insulated or thermally conductive material by controlling the relative pressures applied to ports 154 and 155.

FIG. 10 sets forth a perspective view of the arrangement of the supporting vanes of panel 10. For purposes of illustration, top 11, bottom 12, and sides 14 and 15 are shown in dashed outline. In addition, foils 70, 71 and 72 are omitted from FIG. 10 to better show the relative positions of the supporting vanes. Accordingly, vanes 40, 41 and 41 extend upwardly from side 14 in a parallel arrangement. Similarly, vanes 43, 44 and 45 extend upwardly from side 15 in a parallel relationship. Vanes 80, 81 and 82 extend upwardly from top 11 in a parallel angular relationship and vanes 90, 91 and 92 extend upwardly from bottom 12 in a corresponding parallel angular relationship. It should be noted that the combination of vanes 40, 43, 80 and 90 form the four-side support for foil 70 and generally resemble the frustrum of a square based pyramid. It should be further noted that the combination of vanes 41, 81, 44 and 91 form a similar arrangement in supporting foil 71 (seen in FIG. 2). Further, the combination of vanes 42, 82, 45 and 92 also form a similar arrangement in supporting foil 72 (seen in FIG. 2).

What has been shown is a configurable panel for selective insulation or heat transmission which provides substantial benefits in absorbing or utilizing solar energy as well as the selective conduction or insulation of thermal energy through the panel. The structure shown accomplishes the switching of thermal characteristics solely through the use of variations in applied pressure or vacuum within the panel and utilizes a minimum number of parts.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. A configurable thermal panel comprising:
   a housing defining an interior cavity;
   a plurality of generally planar foil members;
   support means within said interior cavity supporting said foil members in either a separated spaced configuration or a collapsed tightly overlying configuration; and
   support altering means for altering said support means to provide both said separated spaced configuration or said collapsed tightly overlying configuration and to switch therebetween.

2. A configurable thermal panel as set forth in claim 1 wherein said housing defines interior surfaces and wherein said support means includes a plurality of inwardly extending vanes supported upon said surfaces.

3. A configurable thermal panel as set forth in claim 2 wherein said vanes in said plurality of vanes are arranged in a plurality of groups in which each group of vanes supports a corresponding one of said foil members.

4. A configurable thermal panel as set forth in claim 3 wherein said support means includes spring means resiliently urging said vanes toward positions supporting said foil members in their separated spaced configuration.

5. A configurable thermal panel as set forth in claim 4 wherein said housing includes a first and second generally planar facets supported on opposite sides of said plurality of foil members.

6. A configurable thermal panel as set forth in claim 5 wherein said housing includes a pair of vent passages one on each side of said plurality of foil members providing communication with said interior cavity.

7. A configurable thermal panel as set forth in claim 5 wherein said first planar facet is formed of a transparent material and said second planar facet is formed of an opaque thermally conductive material.

8. A configurable thermal panel as set forth in claim 5 wherein said first and second planar facets are formed of an opaque thermally conductive material.

9. A configurable thermal panel as set forth in claim 3 wherein said vanes are formed of a resilient material and wherein said interior surfaces define a plurality of angled grooves each receiving a portion of one of said vanes to support said vanes in parallel angled groups.

10. A configurable thermal panel comprising:
    a housing defining first and second generally planar spaced apart facets and surrounding side members enclosing said first and second planar facets to define an interior cavity therebetween and defining interior surfaces having a plurality of angled grooves therein;
    a plurality of generally planar foil members;
    a plurality of elongated resilient vanes having edge portions received within said angled grooves and extending inwardly from said side members into said interior cavity resiliently supporting said foil members in a thermally insulating parallel spaced arrangement; and
    operating means for overcoming the resilient support of said foils and collapsing said foil members against said second facet in a tight thermally conductive arrangement.

11. A configurable thermal panel as set forth in claim 10 wherein said first facet is formed of a transparent material and said second facet is formed of an opaque thermally conductive material.

12. A configurable thermal panel as set forth in claim 10 wherein said first and second facets are formed of an opaque thermally conductive material.

13. A configurable thermal panel as set forth in claim 12 wherein said planar foil members includes a foil member most proximate to said first facet defining a gas-tight boundary between said interior surfaces and dividing said interior cavity and wherein said operating means include means for providing a greater air pressure between said first facet and said most proximate foil member to collapse said foil members.

14. A configurable thermal panel comprising:
    a housing defining a first generally planar facet, surrounding side members encircling said first facet and forming an interior cavity having an open end;
    a second generally planar facet;
    means moveably supporting said second facet within said open end;
    seal means sealing said second facet to said side members and sealing said interior cavity;
    a plurality of generally planar foil members;
    means resiliently supporting said plurality of foil members in a spaced parallel array between said first and second facets within said interior cavity; and
    vacuum means for evacuating said interior cavity to collapse said foil members and said second facet against said first facet.

* * * * *